March 3, 1964
H. E. HODGES ETAL
3,123,112
STUMP CUTTER
Filed Dec. 22, 1958
2 Sheets-Sheet 1
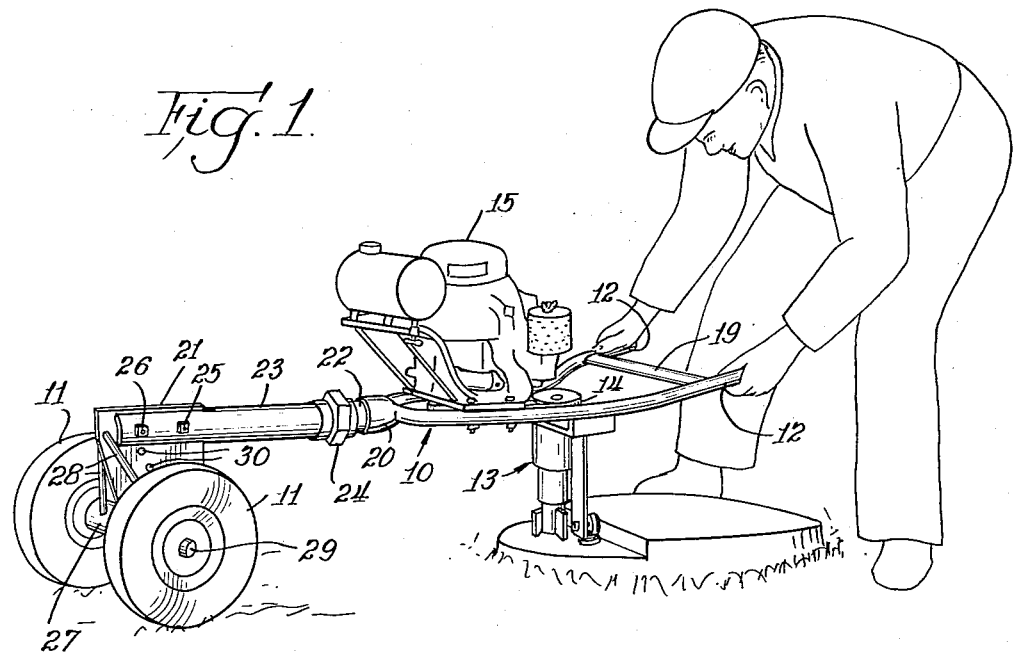
Fig. 1.
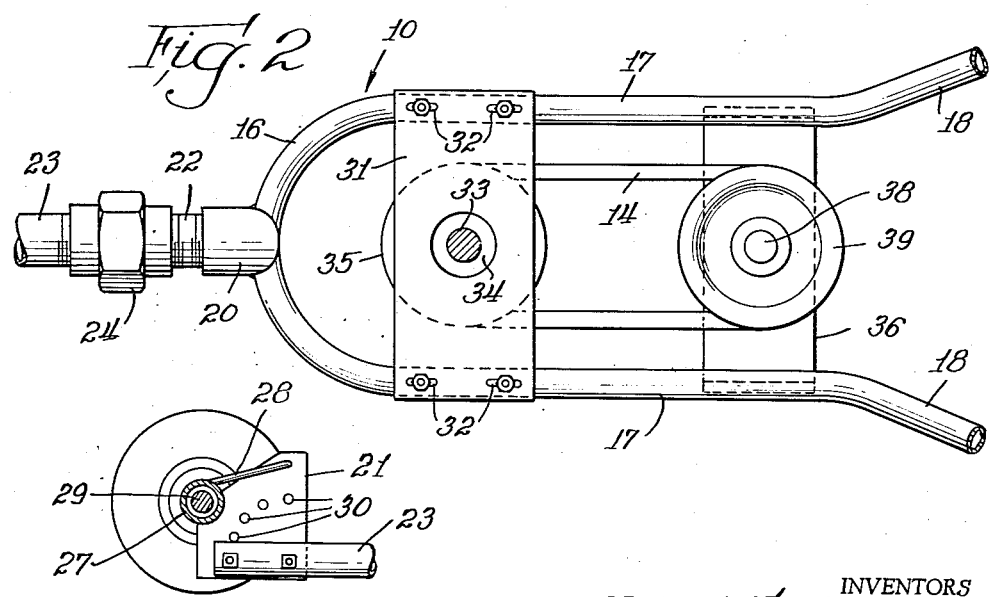
Fig. 2.
Fig. 6.
INVENTORS
Hubert Earl Hodges
and Burton Garvin Frame
By Eugene M. Giles Att'y

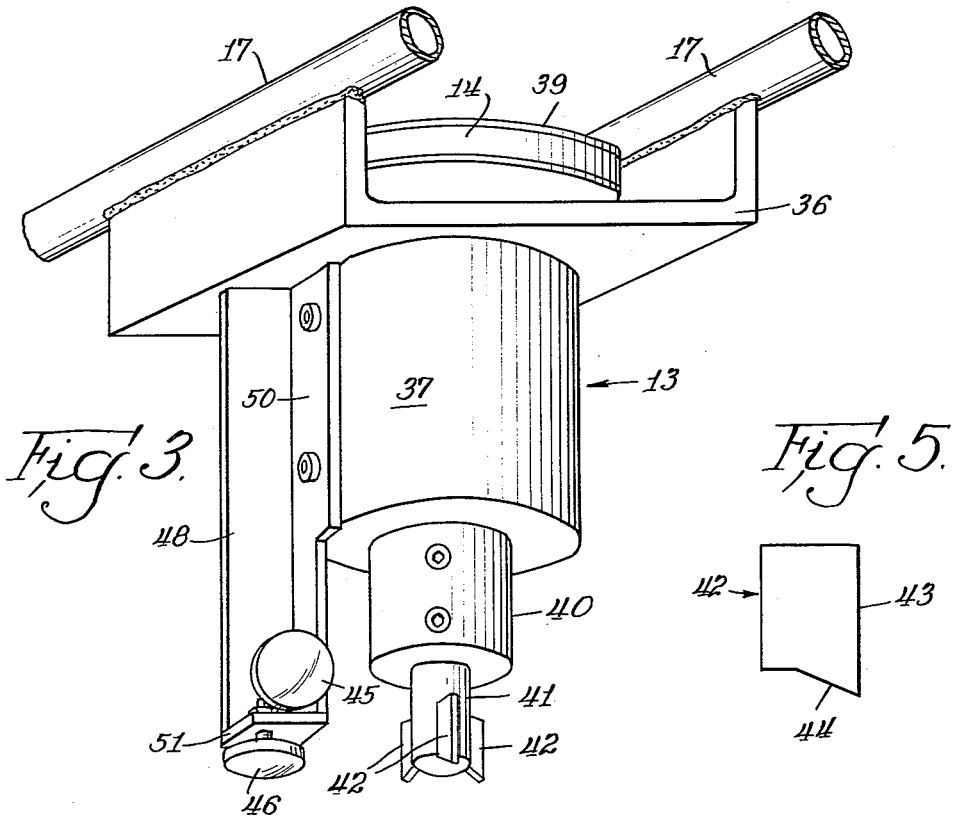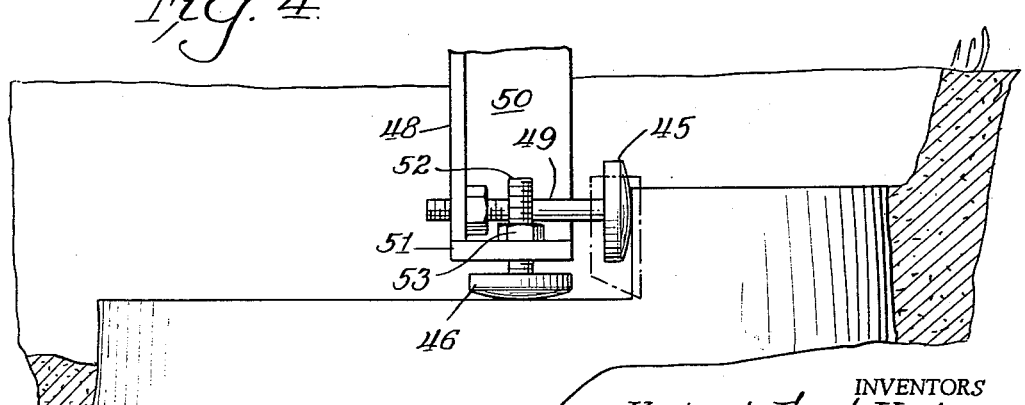

United States Patent Office 3,123,112
Patented Mar. 3, 1964

3,123,112
STUMP CUTTER
Hubert Earl Hodges and Burton Garvin Frame, Cedar Lake, Ind., assignors to Cedar Lake Engineering Co., Cedar Lake, Ind., a copartnership
Filed Dec. 22, 1958, Ser. No. 782,119
4 Claims. (Cl. 144—2)

This invention relates to a stump cutter and has reference more particularly to a portable apparatus or implement for cutting off the top of a stump and particularly adapted to cut it off to a substantial level below the surrounding surface of the ground so that it may be completely covered with a thick layer of earth.

Sawing equipment is available for cutting trees or cutting off stumps at relatively low levels above the ground, but it is usually desirable to cut the stumps off to a lower level, generally at a substantial distance below the surrounding surface of the ground, so that they not only offer no obstruction thereabove but at a depth to permit complete coverage of the stump with a substantial layer of earth.

Facilities have been provided heretofore for this purpose, as for example with a standard which is set on the ground or a post driven into the ground on which a cutting device is mounted to swing and tilt and slide on the standard or post, but these are awkward to use and manipulate and inconvenient for change of position around the stump and present some hazard on account of possible displacement of the post or standard and they also have not been provided with regulation of the depth or width of cut, and present considerable difficulty in making a satisfactory cut.

The principal objects of the present invention are to provide an improved stump cutting apparatus or implement which is readily adaptable to the varying conditions encountered in use thereof and which is simple in construction and convenient to manipulate; to insure such stability of the implement in use that it is not accidentally displaceable and hazards are avoided; to permit location of the implement in any desired position with relation to the stump and convenient change of position thereof as conditions may require from time to time during the cutting operation; to provide elevational and lateral tilting adjustments which may be desired for depth of cut and to compensate for uneven ground support of the implement; to provide convenient and dependable regulation of depth and thickness of cut for better cutting operation and avoidance of digging which may be detrimental or hazardous; to provide an improved cutter which is particularly suitable for the hard usage to which the cutters are subjected in such cutting operations; and to provide easy transport of the implement from place to place and without delay in operating on successive stumps, these and other objects being accomplished as pointed out more particularly hereinafter and as shown in the accompanying drawings, in which:

FIG. 1 is a perspective view of a stump cutting machine embodying the present invention.

FIG. 2 is a fragmentary top view of the frame of the machine illustrated in FIG. 1, with the engine or motor thereof removed and the motor shaft in section;

FIG. 3 is an enlarged perspective view of the cutter mechanism assembly and mounting thereof;

FIG. 4 is a detailed view of a portion of the cut controlling subassembly illustrated in FIG. 3 and illustrating its relation to a stump being cut by the router of the present invention;

FIG. 5 is a detailed view of one of the cutter bits of the routing cutter utilized in the present invention; and FIG. 6 is a detail view of the elevation adjusting facilities of the present invention in a different position than that in which it is shown in FIG. 1.

As shown in the drawings and explained particularly hereinafter, the machine or implement comprises an elongated frame 10 which is supported by a pair of wheels 11 at one end in an elevationally adjustable manner and has a pair of widely spaced grip portions or handles 12 at the other end for manipulation of the implement by the operator and this frame is provided at a place relatively near to the handle end with depending cutting mechanism 13 of router type at a place where the operation thereof is readily observable by the operator, and this cutting mechanism is operated by a belt 14 from a motor or prime mover 15 of gasoline engine type which is mounted on the top of the frame.

The frame 10 is preferably of pipe with the operator end portion thereof in the form of a loop with a return bend 16 providing laterally spaced side arms 17 extending in a direction which will be referred to herein for convenience as rearwardly toward the operator's end where they are spread apart divergently as indicated at 18 to provide a relatively wide spacing of the grip portions 12 and immediately ahead of said grip portions the side arms are rigidly connected by a cross brace 19. The divergent portions 18 also extend upwardly to position the handles 12 at a conveniently high elevation for manipulation by the operator.

At the middle of the return bend 16 a forwardly extending internally threaded socket 20 is welded or otherwise rigidly secured thereto for connection of a pipe which extends forwardly therefrom and has a bracket plate 21 attached thereto by which the frame is supported by the ground wheels 11 for portability of the implement, the said forwardly extending pipe being preferably composed of two sections, one of which is a short nipple 22 and the other of which is a relatively long pipe length 23 which is secured to the nipple 22 by a conventional union 24 providing convenient adjustability of the pipe section 23 rotatably with respect to the nipple 22.

The pipe length 23 is slotted at the forward end to receive the bracket plate 21 therein in upright position in which it is secured by two bolts 25 and 26, and this plate 21 has an axle supporting tube 27 rigidly secured thereto, as for example by welding, at the bottom of the plate and at its forward extremity (in the position of said plate as shown in FIG. 1) and this tube extends an equal distance at the opposite sides of the plate 21 and is braced thereto by the rods 28.

An axle 29 extends through the tube 27 and has the ground wheels 11 mounted thereon at opposite ends respectively, and these wheels are quite widely spaced to provide ample lateral stability for the implement.

The plate 21 is adjustable in the slot of the tube 23 for varying the elevation at which the frame 10 is supported above the ground and for this purpose the plate has a series of bolt holes 30 arranged at close intervals arcuately around the bolt 25 and adapted to receive the bolt 26, so that the frame may be adjusted to the high elevation as shown in FIG. 1 or to the low position, as shown in FIG. 6, and to a number of intermediate positions providing a wide range of vertical adjustability of the frame on the wheels.

The motor 15 is mounted in upright position on the side arms 17 immediately ahead of the return bend 16 and may be secured at its base on a mounting plate 31 or be provided with flanges for mounting thereof, such plate being shown in FIG. 2, and this plate is provided with slots 32 to receive bolts which are passed through the arms 17 for securing the plate adjustably thereto, and the motor shaft 33 projects downwardly through an opening 34 and has a sheave 35 secured thereto underneath the plate 31.

The cutter mechanism 13 is mounted on the side arms 17 rearwardly of the motor 15 on a plate 36 having upturned ends which are welded to the side arms 17 as best shown in FIG. 3 and this plate 36 has a vertical bearing 37 located centrally thereof on the underside for an upright shaft 38 which projects upwardly above the plate 36 and has a sheave 39 thereon connected by the belt 14 with the motor sheave 35.

A chuck 40 is secured to the lower end of the shaft 38 and a cutting tool 41 of router type is detachably secured in the chuck 40 and in the usual manner and is provided with a plurality of cutter bits 42 therearound of the form shown in FIGS. 3 and 5 with outer vertical cutter edges 43 and a bottom cutter edge 44 inclined downwardly and outwardly to meet the vertical cutter edge at an acute angle as shown in FIG. 5.

As the cutter is rotated by the engine, the edges 43 will cut the stump along generally vertical lines while the edges 44 will cut the stump principally at the acute angled point along a generally horizontal plane thereby minimizing frictional contact between the stump and lower surface of the tool and providing somewhat of a saw tooth effect at the bottom with clearance above the cut which facilitates the cutting and preserves the cutters.

It is important in the stump cutting operations to control the width and depth of cut and for this purpose rounded face button-like shoes 45 and 46 are provided which are positioned to engage against previously cut faces of the stump for regulation of the width and depth of cut respectively.

For supporting these shoes an angle iron type of bracket 47 is secured to the bearing 37 to extend downwardly therefrom and has a side flange 48 through which the threaded stem 49 of the width cut shoe 45 is threaded near the bottom of said flange and secured by a nut 50 for adjustment thereof and this bracket has a bottom plate 51 through which the stem 52 of the depth cut shoe 46 is threaded and secured by a nut 53 for adjustment thereof.

In removing a stump the operator may first set the cutting width controlling shoe or stop 45 for the desired width of cut and the depth controlling shoe 46 for the desired depth of cut. After the engine is started the operator, by proper manipulation of the handles 12, brings the cutting tool into cutting engagement with the upstanding side surface of the stump and after an initial cut into the side of the stump, may allow the machine to be supported on the shoe or stop 46 as the operator moves the tool laterally from side to side of the stump during each cutting pass. During these cutting passes the frame easily pivots about the supporting wheels 11. For accurate control of each cutting pass the operator need concern himself only with maintaining the shoe or stop 45 against the upstanding surface of the stump while the tool is supported by the wheels 11 and shoe or stop 46.

As successive layers of stump are removed, the bracket 21 may be adjusted to lower the frame on the wheels to perform the successive cutting operations in parallel planes or to compensate for ground supporting surfaces at varying elevations adjacent the stump.

Moreover, if the ground is not level at the stump location, as for example on hillsides, the wheels may be adjusted to necessary positions of angularity laterally with respect to the frame by releasing the union 24 and relatively adjusting the pipe sections 22 and 23 so that the router swings in the desired plane of cutting operation irrespective of the slope of the surface on which the ground wheels are supported.

When finished with a stump removal operation, the operator may conveniently wheel the machine to any other location, and commence another stump removing operation without requiring any elaborate setup time.

While we have shown and described our invention in a preferred form, we are aware that various changes and modifications may be made therein without departing from the principles of the invention, the scope of which is to be determined by the appended claims.

What we claim is:

1. A stump router including a frame having one end thereof wheel supported and having an operator guiding handle at the other end thereof, said frame having a depending routing tool and power means for driving said routing tool, a depending support carried by said frame, an outwardly facing cut width controlling shoe having a stem in adjustable threaded engagement with said support, and a downwardly facing cut depth controlling shoe, said depth controlling shoe having a stem in adjustable threaded engagement with said support, whereby the frame and tool may pivot generally about said wheel supported end while maintained in substantially the same plane by said depth controlling shoe and the width of the cut is controlled by engagement of said outwardly facing shoe with a generally vertically extending surface of the stump.

2. A stump router including a generally elongated frame and a prime mover supported on said frame intermediate the ends thereof in upstanding relation thereto, a ground engaging wheel support for one end of said frame providing longitudinal and lateral movement of said frame over the ground, and an operator manipulable handle portion at the other end of said frame to provide a guiding support for the frame, a routing tool supported by said frame intermediate the ends thereof and depending therefrom, and means providing a driving connection between said prime mover and said routing tool, said wheel support including a pair of wheels carried by a plate, said plate being pivotally mounted on said frame, and means are provided for adjusting the position of said plate and thereby adjusting the position of said wheels vertically with respect to said frame to allow adjustability of the height of said frame relative to a supporting surface.

3. A stump router including a generally elongated frame and a prime mover supported on said frame intermediate the ends thereof in upstanding relation thereto, a ground engaging wheel support for one end of said frame providing longitudinal and lateral movement of said frame over the ground, and an operator manipulable handle portion at the other end of said frame to provide a guiding support for the frame, a routing tool supported by said frame intermediate the ends thereof and depending therefrom, and means providing a driving connection between said prime mover and said routing tool, said wheel support including a pair of wheels supported on an axle, a plate pivotally mounted on said frame, said axle being carried by said plate, said plate having a plurality of apertures spaced with respect to one another and equidistantly spaced from the pivot axis, and a securing pin passed through said frame and a selected one of said apertures for a selected height of said frame and routing tool relative to said wheels.

4. A stump router including a frame having one end thereof wheel supported and an operator guiding handle at the other end thereof, said frame having power means intermediate the ends thereof and a depending routing tool driven by said power means, and a supporting shoe carried by the frame intermediate the ends thereof and having a stump engaging lower surface whereby the intermediate portion of the frame is supported by said shoe as the tool pivots about said wheel supported end during movement through the cutting passes on a stump, said shoe being carried by a support and a cut width controlling shoe is carried by said support with a stump engaging face thereof extending generally transversely to the face of said first named shoe, said first named shoe being adjustable upwardly and downwardly with respect to said support, and said cut width controlling shoe being adjustable outwardly and inwardly with relation to said support, whereby the depth and width of the cut are controlled by allowing the assembly to rest on said first named shoe while the second named shoe is pressed against said stump.

References Cited in the file of this patent

UNITED STATES PATENTS

| | | |
|---|---|---|
| 1,460,617 | Steen et al. | July 3, 1923 |
| 1,761,439 | Driskell | June 3, 1930 |
| 2,568,799 | Fuller | Sept. 25, 1951 |
| 2,591,002 | Pedron | Apr. 1, 1952 |
| 2,672,898 | Schuster | Mar. 23, 1954 |
| 2,815,049 | Herscovitch | Dec. 3, 1957 |
| 2,825,370 | Fieber | Mar. 4, 1958 |

FOREIGN PATENTS

| | | |
|---|---|---|
| 487,366 | France | Apr. 4, 1918 |
| 126,747 | Australia | Feb. 6, 1948 |